(12) United States Patent
Cortese

(10) Patent No.: US 7,883,733 B2
(45) Date of Patent: Feb. 8, 2011

(54) METHOD OF MAKING A BEVERAGE FROM POWDERED MATERIAL IN A SEALED CAPSULE

(75) Inventor: Virginio Cortese, Turin (IT)

(73) Assignee: Lavazza S.p.a., Turin (IT)

( * ) Notice: Subject to any disclaimer, the term of this patent is extended or adjusted under 35 U.S.C. 154(b) by 660 days.

(21) Appl. No.: 11/631,915

(22) PCT Filed: Jul. 8, 2005

(86) PCT No.: PCT/EP2005/053294

§ 371 (c)(1),
(2), (4) Date: Feb. 19, 2008

(87) PCT Pub. No.: WO2006/005736

PCT Pub. Date: Jan. 19, 2006

(65) Prior Publication Data

US 2009/0035438 A1 Feb. 5, 2009

(30) Foreign Application Priority Data

Jul. 9, 2004 (IT) .......................... TO2004A0476

(51) Int. Cl.
  *A23L 2/00* (2006.01)
(52) U.S. Cl. .......................... 426/590; 426/594; 426/78; 426/595; 426/596; 426/597; 426/433; 426/435
(58) Field of Classification Search ................. 426/590, 426/594, 78, 595, 596, 597, 433, 435
See application file for complete search history.

(56) References Cited

U.S. PATENT DOCUMENTS

| 4,029,003 | A | * | 6/1977 | Manareis |
| 4,724,752 | A | * | 2/1988 | Aliesch et al. |
| 5,197,374 | A | * | 3/1993 | Fond ........................... 99/295 |
| 5,242,702 | A | * | 9/1993 | Fond ........................... 426/433 |
| 5,347,916 | A | * | 9/1994 | Fond et al. .................... 99/295 |
| 5,398,595 | A | * | 3/1995 | Fond et al. |
| 5,398,596 | A | * | 3/1995 | Fond ........................... 99/295 |
| 5,897,899 | A | * | 4/1999 | Fond ........................... 426/112 |
| 6,182,554 | B1 | * | 2/2001 | Beaulieu et al. |
| 6,240,832 | B1 | * | 6/2001 | Schmed et al. |
| 6,431,055 | B2 | * | 8/2002 | Bonanno |
| 6,499,388 | B2 | * | 12/2002 | Schmed |

(Continued)

FOREIGN PATENT DOCUMENTS

EP   1 219 217   7/2002

(Continued)

*Primary Examiner*—Anthony Weier
(74) *Attorney, Agent, or Firm*—Ladas & Parry LLP

(57) ABSTRACT

In a process employing a coffee machine, a sealed capsule is fed with a certain amount of axial clearance into a cup aligned along a horizontal axis with a pressurized-hot-water sprinkler, and is moved towards the sprinkler to press an annular flange of the sealed capsule in fluidtight manner against the sprinkler, to pierce a front sealing wall of the sealed capsule by means of a first piercing device, to feed pressurized hot water through the sealing wall to expand the sealed capsule axially and eliminate the axial clearance, and to bring an end wall of the sealed capsule into fluidtight contact with a second piercing device, and pierce the end wall against the second piercing device, so that coffee flows out through the second piercing device.

7 Claims, 3 Drawing Sheets

U.S. PATENT DOCUMENTS

| | | | |
|---|---|---|---|
| 6,536,332 B2 * | 3/2003 | Schmed | |
| 6,606,938 B2 * | 8/2003 | Taylor | |
| 6,644,173 B2 * | 11/2003 | Lazaris et al. | |
| 6,655,260 B2 * | 12/2003 | Lazaris et al. | |
| 6,763,759 B2 * | 7/2004 | Denisart | 99/302 P |
| 6,792,980 B1 * | 9/2004 | Cortese | 141/1 |
| 6,832,542 B2 * | 12/2004 | Hu et al. | |
| 7,028,604 B2 * | 4/2006 | Cortese | 99/295 |
| 2003/0070554 A1 * | 4/2003 | Cortese | |
| 2006/0016347 A1 * | 1/2006 | Girard et al. | 99/295 |

FOREIGN PATENT DOCUMENTS

| | | |
|---|---|---|
| EP | 1 295 554 | 3/2003 |
| EP | 1 776 026 | 4/2007 |

* cited by examiner

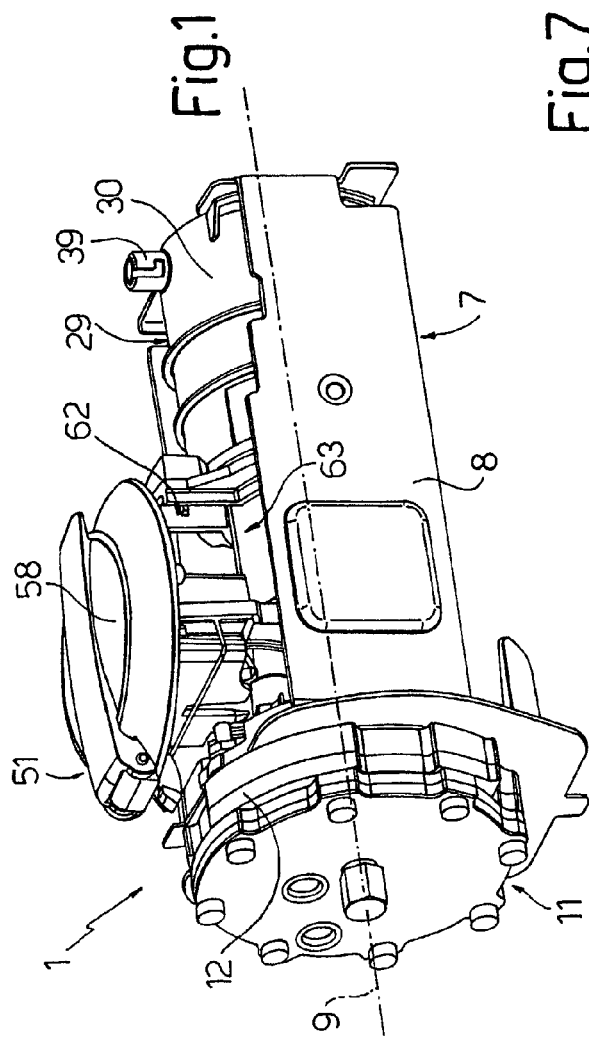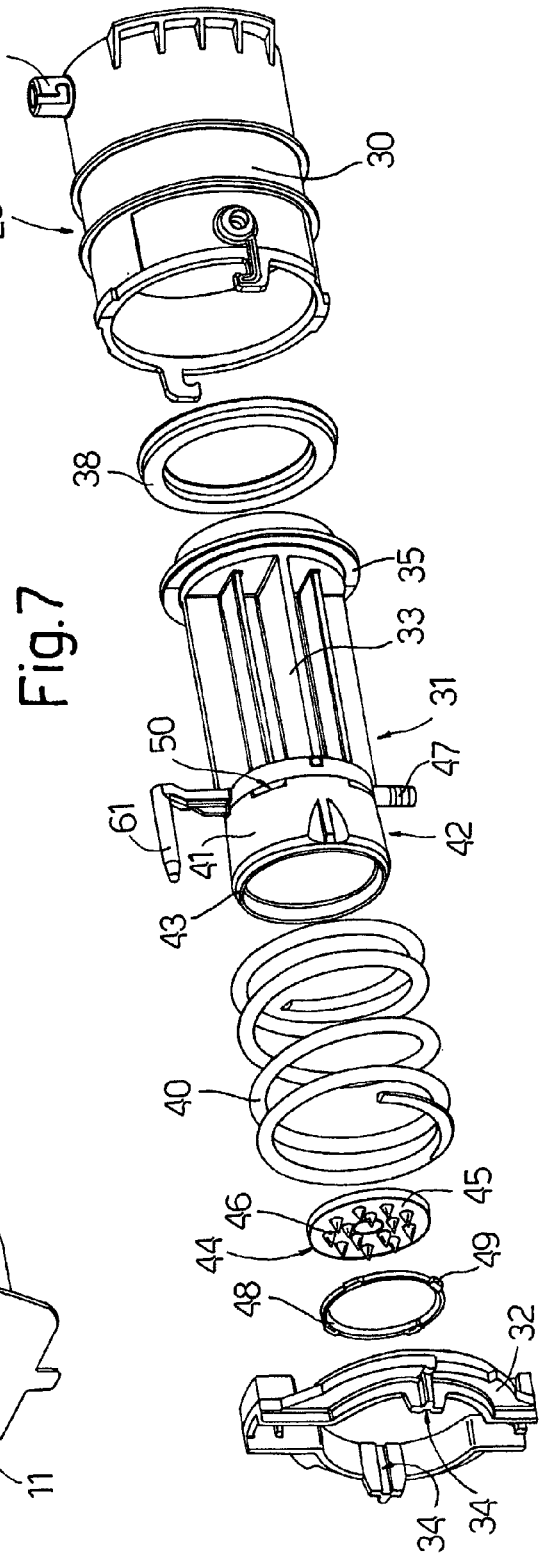

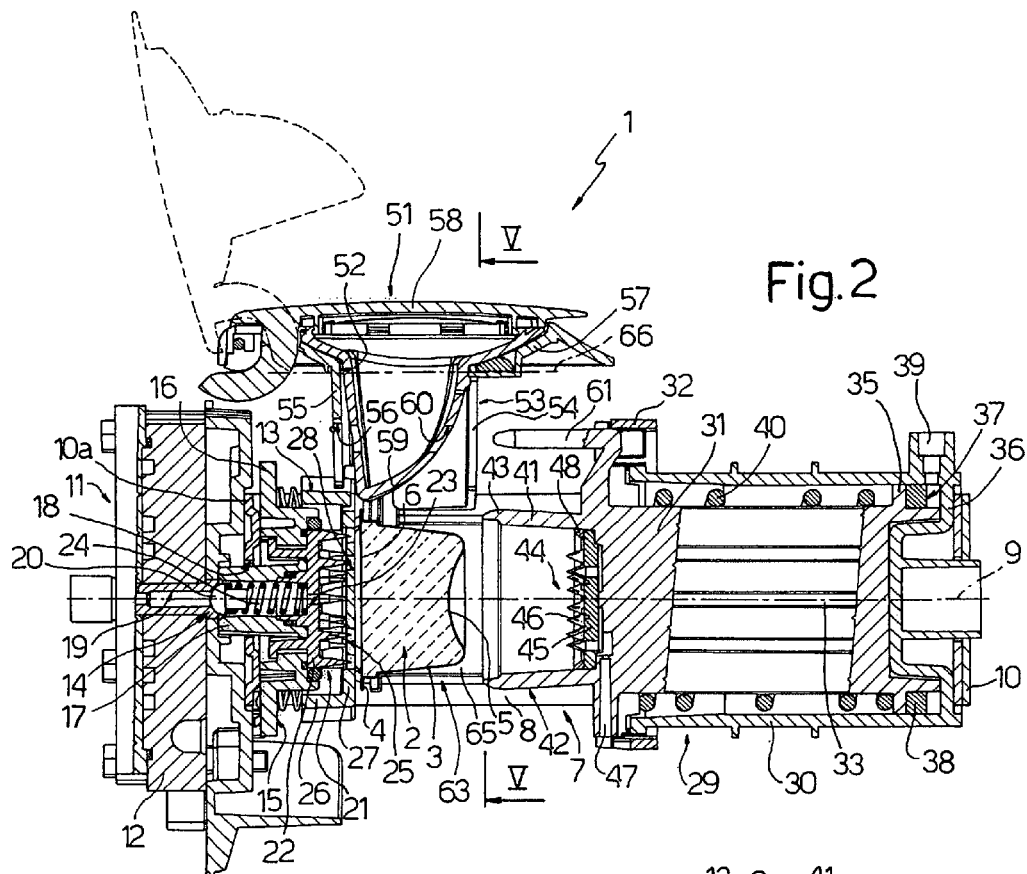
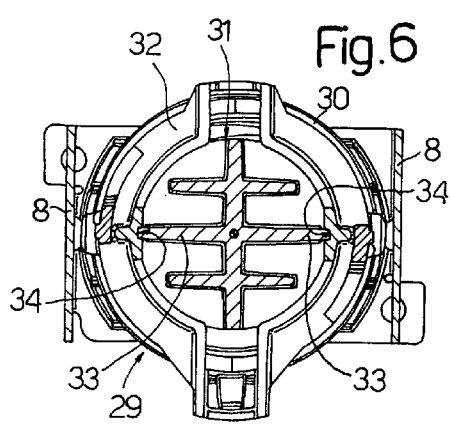
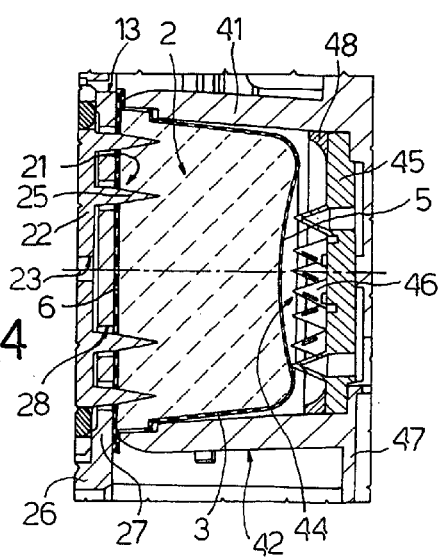
Fig. 2
Fig. 6
Fig. 4

METHOD OF MAKING A BEVERAGE FROM POWDERED MATERIAL IN A SEALED CAPSULE

TECHNICAL FIELD

The present invention relates to a method of making a beverage from powdered material in a sealed capsule.

Though the method of the present invention is suitable for percolating any type of beverage made by feeding pressurized hot water through powdered material in a sealed capsule, specific reference is made in the following description, purely by way of example, to a method for making a coffee beverage from a measure of ground coffee in a cup-shaped sealed capsule closed at one end by an end wall, and at the other end by a sealing wall connected integrally to an outer annular flange extending radially outwards from an end of a lateral wall of the sealed capsule.

BACKGROUND ART

Use of sealed capsules of the above type in a percolating machines is described, for example, in EP-1 219 217 and EP-1 295 554 of the same Applicant and in U.S. Pat. No. 5,398,596.

In percolating machines employing non-sealed capsules, percolation is normally performed by sealing a capsule axially and in fluidtight manner between a sprinkler of a pressurized-hot-water dispensing assembly and a piston movable to and from the sprinkler and having an outflow conduit for the percolated beverage.

The same method cannot be used when employing sealed capsules of the type described above, which are made of deformable material incapable of withstanding the axial compression to which non-sealed capsules are normally subjected to ensure fluidtight engagement of their end walls with the sprinkler at one end and with the piston at the other.

DISCLOSURE OF INVENTION

It is an object of the present invention to provide a percolating method enabling use of sealed capsules without affecting their structural stability.

According to the present invention, there is provided a method of making a beverage from powdered material in a sealed capsule, as claimed in claim 1 and, preferably, in any one of the following Claims depending directly or indirectly on claim 1.

BRIEF DESCRIPTION OF THE DRAWINGS

A non-limiting embodiment of the invention will be described by way of example with reference to the accompanying drawings, in which:

FIG. 1 shows a view in perspective of a machine implementing the method according to the present invention;

FIGS. 2 and 3 show axial sections, with parts removed for clarity, of the FIG. 1 machine in respective different operating positions;

FIG. 4 shows a larger-scale detail of FIG. 2 in a further operating position;

FIG. 6 shows a section along line VI-VI in FIG. 3;

FIG. 7 shows an exploded view of part of the FIG. 1 machine.

BEST MODE FOR CARRYING OUT THE INVENTION

Figure 3:
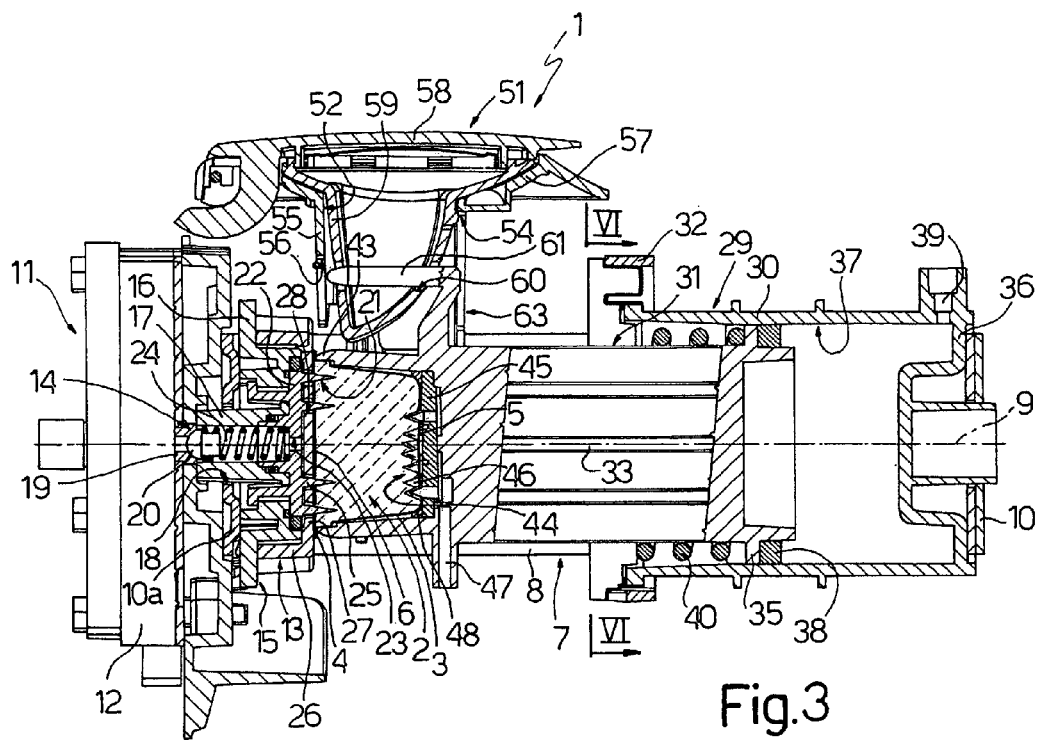

Number 1 in FIG. 1 indicates as a whole a percolating machine for making a coffee beverage from a measure of ground coffee in a sealed capsule 2, which comprises a cup-shaped body made of thermoplastic material and having a truncated-cone-shaped lateral wall 3 having an outer annular flange 4 at its major base, and closed at its minor base by an inwardly convex end wall 5. At the major base of lateral wall 3, the cup-shaped body is closed in fluidtight manner by a sealing wall 6 normally made of metal foil, and the periphery of which is integral with the outer surface of annular flange 4.

Machine 1 comprises a frame 7, in turn comprising two substantially rectangular plates 8 located symmetrically on opposite sides of and parallel to a horizontal axis 9, and connected to each other at one longitudinal end by a transverse wall 10, and at the opposite longitudinal end by a transverse wall 10a fitted through with a pressurized-hot-water dispensing assembly 11 coaxial with axis 9.

As shown in FIGS. 2 and 3, dispensing assembly 11 comprises a known boiler 12 located outwards of transverse wall 10a and for receiving pressurized water from a known pump (not shown); and a sprinkler 13 connected to boiler 12 through transverse wall 10a to receive pressurized hot water from boiler 12 via a one-way valve 14 calibrated to open when the pressure upstream from one-way valve 14 reaches a given value.

Dispensing assembly 11 also comprises a tubular body 15, which is interposed between boiler 12 and sprinkler 13, has, at the end facing boiler 12, an annular flange 16 connected integrally to transverse wall 10a, and has a central through hole coaxial with axis 9 and housing an end portion of a truncated-cone-shaped sleeve 17 extending through a hole 18 in transverse wall 10a and connected integrally to boiler 12.

As shown in FIG. 2, at the end facing boiler 12, sleeve 17 communicates with the outlet of a feed conduit 19 fitted through boiler 12 and defining, at the end communicating with sleeve 17, a spherical seat for supporting a shutter 20 of valve 14.

Tubular body 15 supports a piercing device 21 comprising a circular plate 22, which is coaxial with axis 9, is fitted in fluidtight manner to the end of tubular body 15 via the interposition of two annular seals, one surrounding the periphery of plate 22, and is connected removably to tubular body 15 by a bayonet joint. Plate 22 has a central through hole 23 coaxial with axis 9, and, on the side facing boiler 12, comprises a tubular appendix fitted in fluidtight manner, via the interposition of an annular seal, inside the end of sleeve 17 opposite the end engaged by feed conduit 19, so as to define a seat for a spring 24 by which shutter 20 is pushed against its spherical seat.

In addition to plate 22, piercing device 21 also comprises a number of needles 25 integral with one another and with plate 22, and extending, parallel to axis 9, from plate 22 towards transverse wall 10.

Sprinkler 13 is substantially cup-shaped, is coaxial with axis 9, with its concavity facing boiler 12, and comprises a cylindrical lateral wall 26 fitted in axially-sliding manner to a cylindrical outer surface of tubular body 15; and an end wall 27 parallel to and facing plate 22, and having a number of holes 28, each coaxial with a respective needle 25.

As shown in FIGS. 2 and 3, sprinkler 13 is mounted to move, in opposition to a number of springs 29 compressed between flange 16 of tubular body 15 and sprinkler 13 itself, between an extracted rest position (FIG. 2), in which end wall 27 is kept detached from plate 22 by a known stop device (not shown), and needles 25 are housed inside sprinkler 13, and a withdrawn work position (FIG. 3), in which end wall 27 contacts plate 22, and needles 25 project from respective holes 28.

In addition to dispensing assembly 11, machine 1 also comprises a hydraulic cylinder 29, which is housed between plates 8 of frame 7, coaxially with axis 9 and facing sprinkler 13, and in turn comprises a fixed tubular body 30 coaxial with axis 9, and a piston 31 coaxial with axis 9 and mounted to slide axially along tubular body 30 and through a ring 32 integral with tubular body 30 and closing the end of tubular body 30 facing dispensing assembly 11.

As shown in FIGS. 2 and 3 and in more detail in FIGS. 6 and 7, an intermediate portion of piston 31 is defined by a finned section, two diametrically opposite radial fins 33 of which engage, in use, respective grooves 34 formed in an inner surface of ring 32 to guide piston 31 axially along tubular body 30, and to lock piston 31 angularly about axis 9 with respect to tubular body 30.

Piston 31 comprises an annular end flange 35, which faces an end wall 36 of tubular body 30, extends radially from piston 31 up to tubular body 30, and defines, between piston 31 and end wall 36, a variable-volume chamber 37, which is closed in fluidtight manner by an annular seal 38 fitted to the end of piston 31, and communicates with the outside via a pressurized-hot-water feed conduit 39. A return spring 40 is mounted between ring 32 and flange 35, and is coiled, coaxially with axis 9, about the intermediate portion of piston 31.

As shown in FIGS. 2 and 3, at the end facing sprinkler 13, piston 31 is fitted with a truncated-cone-shaped tubular appendix flaring towards sprinkler 13, coaxial with axis 9, and defining the lateral wall 41 of a cup 42 for housing a capsule 2, and which is movable, by piston 31 and in a direction parallel to axis 9, between a withdrawn position (FIG. 2) detached from sprinkler 13, and a forward infusion position (FIG. 3), in which, in use, a free edge 43 of cup 42 presses flange 4, of a capsule 2 inside cup 42, in fluidtight manner against sprinkler 13.

Cup 42 houses a piercing device 44 comprising a plate 45 resting on the bottom of cup 42 and having a number of needles 46, which extend parallel to axis 9, are integral with one another, and, in use, pierce end wall 5 of capsule 2, so that the percolated coffee flows out from capsule 2 and through a number of holes, formed through needles 46 and plate 45, into an outflow conduit 47.

Plate 45 is locked to the bottom of cup 42 by an elastic retaining ring 48 comprising, as shown clearly in FIG. 7, a number of outer appendixes 49, which engage respective through slots 50 formed at the base of lateral wall 41 of cup 42. One of slots 50 is left free to tighten elastic ring 48 from the outside, and to remove elastic ring 48 and plate 45.

As shown in FIGS. 1 and 2, machine 1 also comprises a loading device 51 located between sprinkler 13 and cup 42, and which receives a capsule 2 downwards, and holds it in position coaxial with axis 9, with sealing wall 6 substantially contacting end wall 27 of sprinkler 13.

Figure 5:
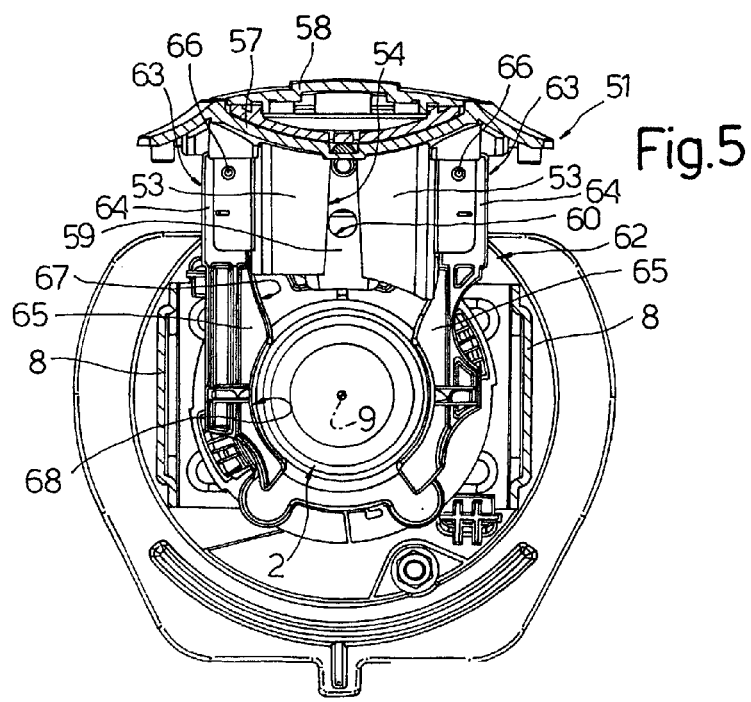
FIG. 5 shows a section along line V-V in FIG. 2.

Loading device 51 comprises an inlet conduit 52 integral with frame 7 and sized to permit insertion of a capsule 2, positioned with sealing wall 6 facing sprinkler 13, in a substantially vertical loading direction perpendicular to axis 9. As shown in FIGS. 1 and 5, inlet conduit 52 is bounded, on the side facing cup 42, by two plates 53 crosswise to axis 9 and defining a gap 54, and, on the side facing sprinkler 13, by a plate 55 crosswise to axis 9 and having a central slot 56 aligned with gap 54. At the top, inlet conduit 52 has an annular flange 57, which cooperates with a lid 58 hinged to flange 57 to rotate, about an axis crosswise to axis 9, between an open position opening inlet conduit 52 (as shown by the dash line in FIG. 2), and a closed position closing inlet conduit 52. Lid 58 is fitted, on its inner surface, with an appendix 59 having a through hole 60 which, when lid 58 is in the closed position, is aligned with gap 54 and slot 56, and is engaged transversely (FIG. 3), when cup 42 is moved into the infusion position, by a pin 61 fitted rigidly to the top of piston 31 and which locks lid 58 in the closed position.

Loading device 51 also comprises a gripping device 62, in turn comprising two jaws 63 (FIG. 5) extending downwards from flange 57, located symmetrically on opposite sides of axis 9, and each comprising a top portion 64, and a curved bottom portion 65 with its concavity facing the other bottom portion 65. Each top portion 64 is hinged at its top end to a respective fixed pin 66, parallel to axis 9, to oscillate, in opposition to a spring (not shown), between a closed position and an open position closing and opening gripping device 62 respectively. In the closed position, top portions 64 define a funnel-shaped seat 67 communicating upwards with the inside of inlet 52, and downwards with a substantially cylindrical seat 68 coaxial with axis 9 and defined by bottom portions 65. Seat 68 is open on the sides facing sprinkler 13 and cup 42, and retains a capsule 2 positioned with its sealing wall 6 substantially tangent to end wall 27 of sprinkler 13.

In actual use, after lifting up lid 58, the user inserts a capsule 2 along inlet conduit 52 into funnel-shaped seat 67; and, when lid 58 is lowered, appendix 59 pushes capsule 2 downwards to part jaws 63 and insert capsule 2 inside seat 68.

When machine 1 is turned on by the user, pressurized hot water is pumped along feed conduit 39 into chamber 37, thus moving cup 42 from the withdrawn to the infusion position. During this movement, edge 43 of cup 42 engages the ends of bottom portions 65 facing cup 42, thus parting jaws 63 to ease capsule 2 into cup 42.

On receiving capsule 2, cup 42 continues along axis 9, thus moving sprinkler 13 from the extracted rest position to the withdrawn work position, so that needles 25 penetrate capsule 2 through sealing wall 6. When cup 42 eventually reaches the forward infusion position, edge 43 presses flange 4 in fluidtight manner against end wall 27 of sprinkler 13.

As shown in FIG. 4, cup 42 is of such a depth that, when cup 42 is in the forward infusion position and capsule 2 is inserted completely inside cup 42, a relatively small axial clearance is left between end wall 5 of capsule 2 and plate 45, and needles 46 are housed inside the gap between end wall 5 and plate 45.

When valve 14 opens and pressurized hot water is pumped into capsule 2 along feed conduit 19 and through hole 23 and holes 28, the high pressure formed inside capsule 2 deforms capsule 2 axially, so that end wall 5 contacts plate 45 in fluidtight manner, needles 46 penetrate capsule 2 (FIG. 3), and a percolating chamber is formed inside capsule 2 and communicating with the outside along outflow conduit 47.

In connection with the above, it should be pointed out that, during percolation, axial thrust to engage capsule 2 and sprinkler 13 in fluidtight manner is applied solely to flange 4, and lateral wall 3 of capsule 2 is only subjected to axial compression when the pressure inside capsule 2 is such as to prevent collapse of lateral wall 3 due to combined bending and compressive stress.

When the user presses a stop button (not shown), pressurized-hot-water supply is cut off, and withdrawal of piston 31 moves cup 42 back into the withdrawn position. Along a first portion of this movement, flange 4 of the used capsule 2 encounters bottom portions 65 of jaws 63, so that capsule 2 is gradually extracted from cup 42; and, when cup 42 is released from jaws 63, the used capsule 2 is retained, facing sprinkler 13, inside seat 68.

When the user inserts a new capsule 2 inside inlet conduit 52 to make another coffee, and closes lid 58, jaws 63 part to drop the used capsule 2.

The invention claimed is:

1. A method of making a beverage from powdered material in a cup-shaped sealed capsule (2), the method comprising the steps of inserting a said sealed capsule (2) between pressurized-hot-water dispensing means (11) and a cup (42) aligned with the dispensing means (11) along a horizontal axis (9), the insertion step being carried out by feeding the sealed capsule (2) downwards along an inlet conduit (52) into a first seat (67) defined between two elastically deformable jaws (63), and applying downward thrust to the sealed capsule (2) inside the first seat (67) to part the two jaws (63) and transfer the sealed capsule (2) from the first seat (67) to a second seat (68) coaxial with said axis (9) and also defined by said two jaws (63); and the method further comprising the steps of piercing a sealing wall (6) fitted integrally to an outer annular flange (4) of the sealed capsule (2) by applying an axial force to said flange (4) and pushing the sealed capsule (2), still coaxial with said axis (9), axially against a first piercing device (21) carried by the dispensing means (11); and piercing an end wall (5) of the sealed capsule (2) opposite to the sealing wall (6) by applying axial compression to the sealed capsule (2) to push the end wall (5) against a second piercing device (44) carried by the cup (42); the axial compression being applied only after feeding pressurized hot water into the sealed capsule (2) through the pierced sealing wall (6).

2. A method as claimed in claim 1, and comprising the steps of retaining, by means of the two jaws (63), the sealed capsule (2) inside the second seat (68) in a position coaxial with the axis (9) and with the sealing wall (6) facing a sprinkler (13) having said first piercing device (21) and forming part of the dispensing means (11), and the annular flange (4) facing a free edge (43) of the cup (42); producing a relative movement of the sprinkler (13) and the cup (42) along said axis (9) and towards one another, so as to bring said free edge (43) into contact with the annular flange (4), thus inserting the sealed capsule (2) with a certain amount of axial clearance inside the cup (42), to press the sealing wall (6) against said first piercing device (21) to pierce the sealing wall (6), and to connect the sealing wall (6) in fluidtight manner to the sprinkler (13); and feeding pressurized hot water, by means of the dispensing means (11), through the pierced sealing wall (6) into the sealed capsule (2), so as to axially expand the sealed capsule (2) inside the cup (42) to eliminate said axial clearance and bring said end wall (5) into fluidtight contact with said second piercing device (44), so that the end wall is pierced by the second piercing device (44) to allow said beverage to flow out through the second piercing device (44).

3. A method as claimed in claim 2, wherein the sealed capsule (2) is inserted inside the cup (42) by transferring the sealed capsule (2) gradually from said second seat (68) to the cup (42), by the cup (42) parting the jaws (63) during the relative movement of the cup (42) towards the sprinkler (13).

4. A method as claimed in claim 2, wherein said relative movement is performed by moving the cup (42) towards the sprinkler (13), in opposition to elastic return means and by means of hydraulic thrust means (29), so that the sealing wall (6) is pierced by the first piercing device (21), and said flange (4) is gripped in fluidtight manner between the sprinkler (13) and the free edge (43) of the cup (42).

5. A method as claimed in claim 4, wherein the sealing wall (6) is pierced by the first piercing device (21) by moving the sprinkler (13), along said axis (9) and by means of the cup (42), between an extracted position, in which the sprinkler (13) covers the first piercing device (21), and a withdrawn position, in which the first piercing device (21) extends through the sprinkler (13).

6. A method as claimed in claim 4, wherein the hydraulic thrust means (29) are activated by said pressurized hot water fed into a variable-volume chamber (37) formed between an outer cylinder (30) and a piston (31), both coaxial with said axis (9); the piston (31) being fitted integrally with the cup (42), and being connected in axially-sliding, angularly-fixed manner to the outer cylinder (30).

7. A method as claimed in claims 1, wherein said downward thrust is applied by moving a lid (58) of said inlet conduit (51) into a closed position closing the inlet conduit (52).

\* \* \* \* \*